United States Patent [19]
Jenn

[11] Patent Number: 5,010,924
[45] Date of Patent: Apr. 30, 1991

[54] SINGLE HANDLE MIXING FAUCET
[76] Inventor: Chin S. Jenn, No. 23-6, Ping Ho St., Ta Lin Chen, Chia I Hsien, Taiwan
[21] Appl. No.: 554,380
[22] Filed: Jul. 19, 1990
[51] Int. Cl.⁵ .......................................... F16K 11/083
[52] U.S. Cl. .............................. 137/625.47; 137/597
[58] Field of Search .............. 137/597, 625.19, 625.46, 137/625.47

[56] References Cited
U.S. PATENT DOCUMENTS

| | | | |
|---|---|---|---|
| 1,886,889 | 11/1932 | Krupp | 137/597 X |
| 2,921,604 | 1/1960 | Zettl | 137/625.47 X |
| 4,562,864 | 1/1986 | Yang | 137/597 |
| 4,653,538 | 3/1987 | Tsutsui et al. | 137/597 X |
| 4,819,694 | 4/1989 | Jiang | 137/597 X |

*Primary Examiner*—Stephen M. Hepperle
*Attorney, Agent, or Firm*—Bacon & Thomas

[57] ABSTRACT

A faucet with a single control arm for regulating water temperature and determining output destination includes a hot water passage, a cold water passage, a shower head outlet and a tub outlet which are communicable by the control arm which pivots a truncated cone received inside a T-shaped faucet body. If the shower head is the desired destination, then the control arm is moved to the left and the water paths inside the truncated cone align unsimultaneously with the water passages, therefore the water temperature can be adjusted. When the tub is the desired output, then the control arm is moved to the right, and the same is true for water temperature regulation.

4 Claims, 6 Drawing Sheets

SINGLE HANDLE MIXING FAUCET

BACKGROUND OF THE INVENTION

The Present invention relates to an improved faucet, in particular to an improved faucet which provides all the required functions of a faucet under the control of a single control arm.

Conventional faucets generally utilize a means, generally a control arm, to control the output of water either to a downward outlet, i.e., the tub, or to a shower head. However, conventional faucets still need another means to selectively regulate the output and ratio of hot and cold water. It is quite inconvenient to control two control arms at the same time during usage of a faucet.

The present invention provides an improved faucet which offers a single control arm which satisfies all of control functions required by a faucet.

SUMMARY OF THE INVENTION

It is an object of the present invention to provide an improved faucet with a control arm to determine the output destination and regulate the output temperature of water.

It is another object of the present invention to provide an improved faucet with a truncated cone having several water passages to control the output and temperature of water.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
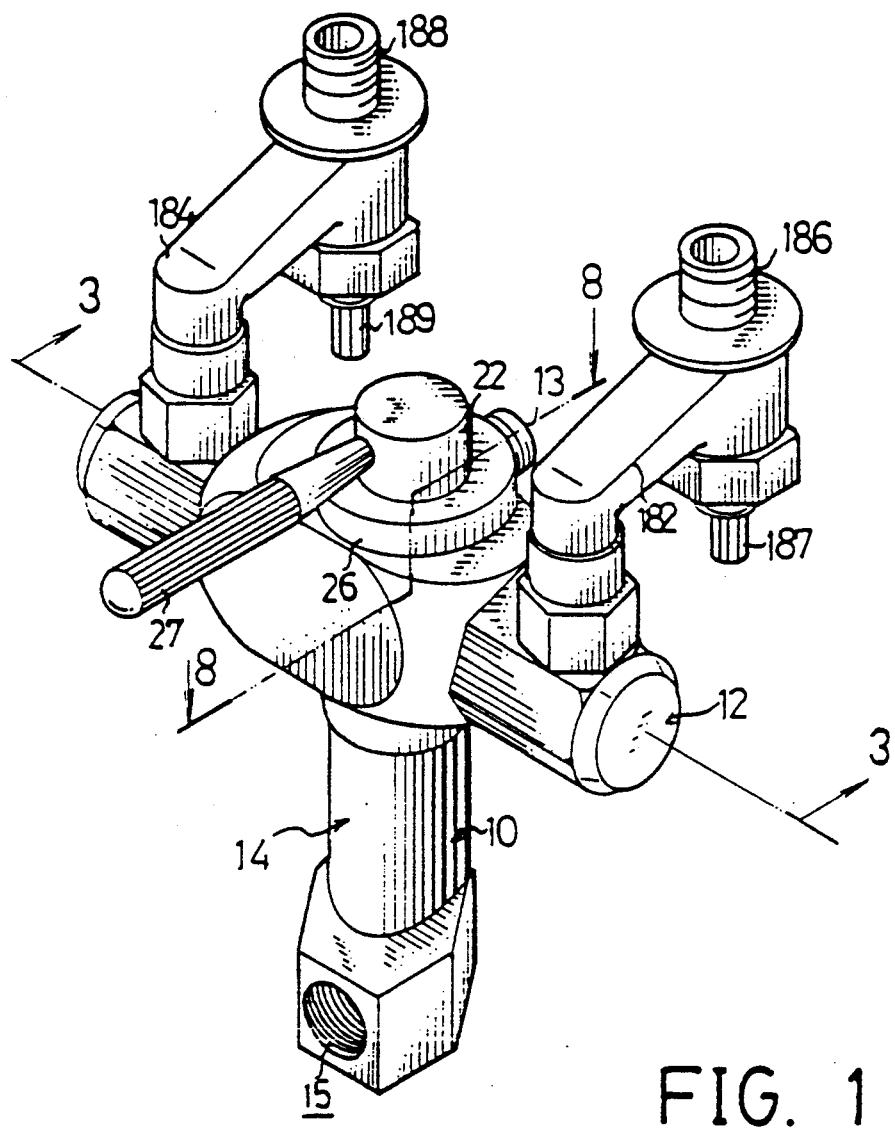
FIG. 1 is a perspective view of an improved faucet in accordance with the present invention.
Figure 2:
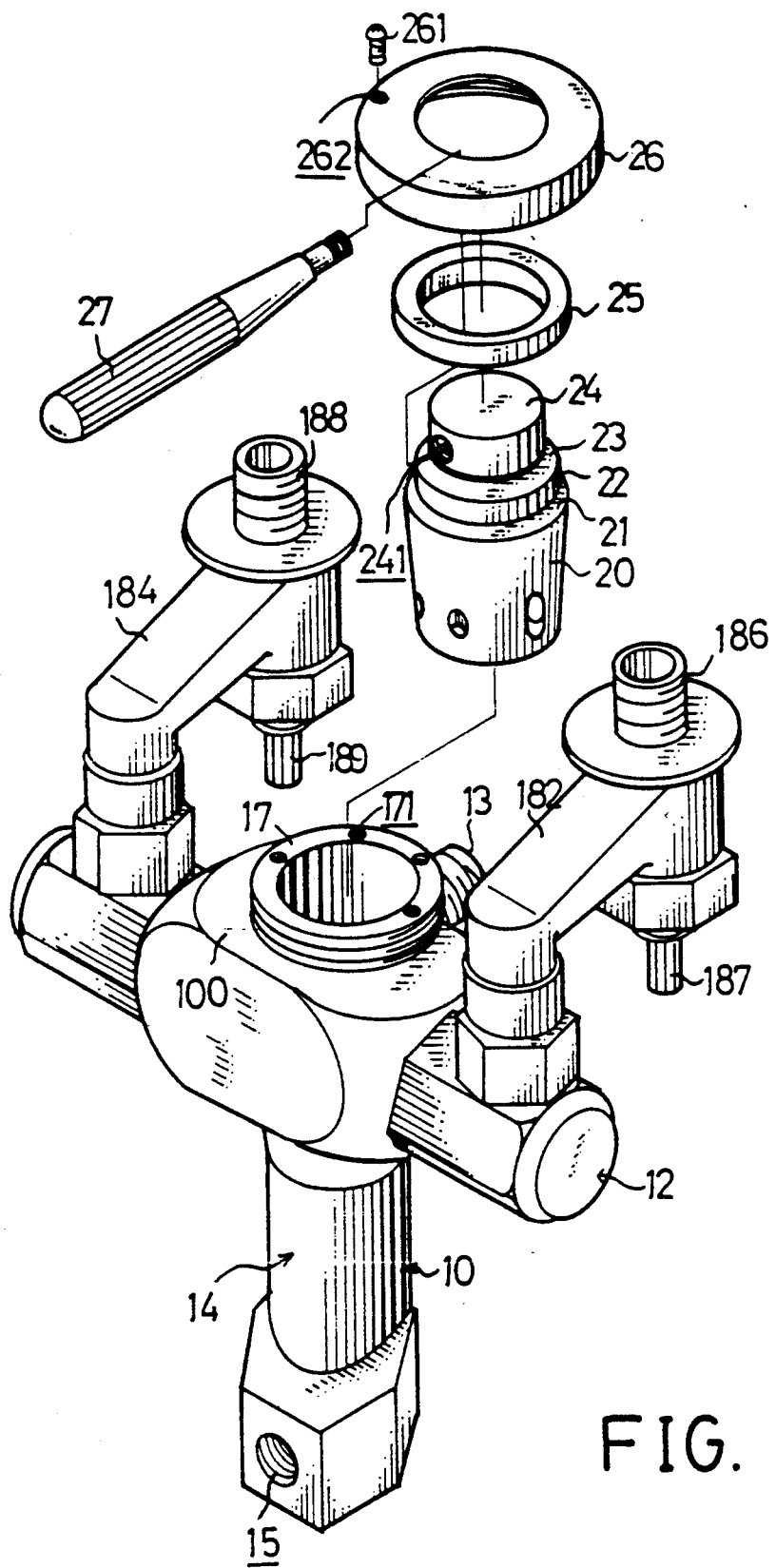
FIG. 2 is an exploded view of the faucet of FIG. 1 in accordance with the present invention.
Figure 3:
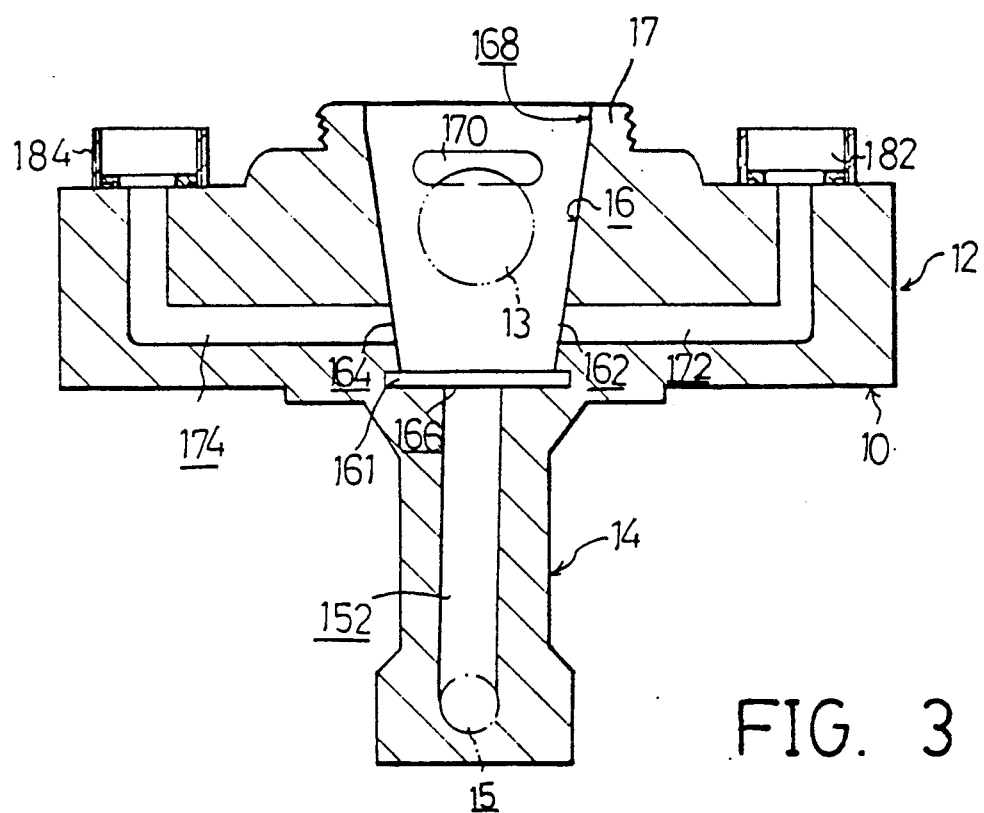
FIG. 3 is a cross-sectional view taken along plane 3—3 of FIG. 1, in which a cap and a washer are removed to show a compartment in the faucet according to the present invention.
Figure 4:
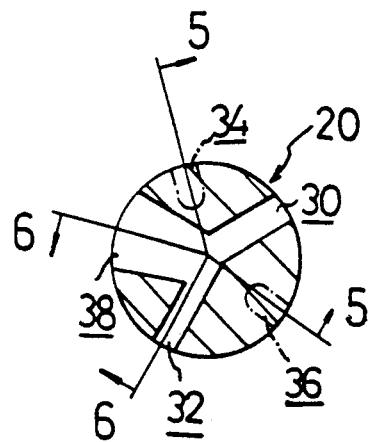
FIG. 4 is a cross-sectional view of a truncated cone provided in the faucet, showing the inner passages therein.
Figure 5:
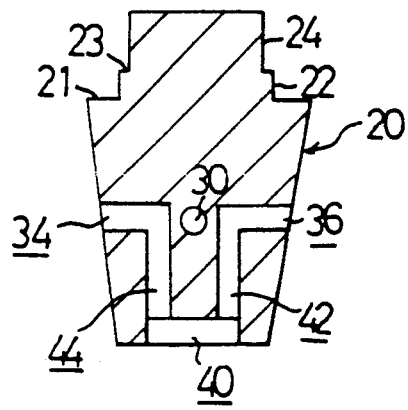
FIG. 5 is a cross-sectional view of the truncated cone taken along line 5—5 of FIG. 4.
Figure 6:
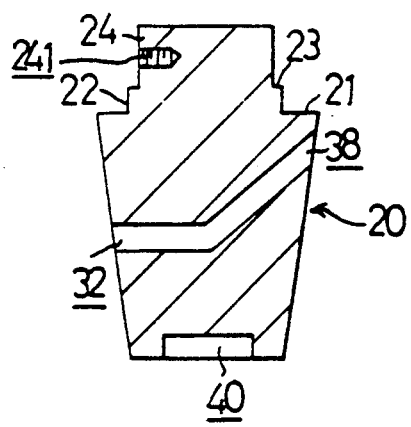
FIG. 6 is a cross-sectional view of the truncated cone taken along line 6—6 of FIG. 4.

Referring to FIGS. 1 through 3, the faucet according to the present invention comprises a substantially T-shaped body 10 composed of a cross portion 12 and a vertical portion 14. A substantially truncated cone-shaped compartment 16 is formed in a middle portion of the cross portion 12. An upper end of the compartment 16 has a diameter larger than that of a lower end of the compartment. Furthermore, the compartment 16 has an extended portion 161 below the lower end thereof, and extends transversely, which will be discussed in detail later.

The compartment 16 has a cold water inlet 162 formed on an inner wall surface thereof. The cold water inlet 162 communicates with a cold water passage 172, which communicates with a cold water pipe 182. The cold water pipe 182 is communicated to a cold water source (not shown) through an inlet 186. An adjusting screw 187 is provided on the cold water pipe 182 for regulating the inlet pressure of cold water.

The compartment 10 also has a hot water inlet 164 formed on the annular wall surface thereof, opposite to the cold water inlet 162. The hot water inlet 164 communicates with a hot water passage 174 which communicates with a hot water pipe 184. The hot water pipe 184 communicates with a hot water source (not shown) through an inlet 188. An adjusting screw 189 is provided on the hot water pipe 184 for regulating the inlet pressure of hot water.

The compartment 16 also has a first outlet 166 formed on a bottom surface thereof, directly communicating with a tub outlet 16 via a vertical passage 152 formed in the vertical portion 14. The compartment 16 also has a second outlet 170 formed on the inner wall surface thereof, above the two water passages 172 and 174. The second outlet 170 communicates with to a shower head (not shown) via a horizontal passage 13 attached to the cross portion 12. The compartment 16 extends upwardly to form an opening 168, which is defined by an annular flange 17 protruding from top wall 100 which encloses the compartment 10, through which a truncated cone 20 is passed and received into the compartment 16. The annular flange 17 is threaded at an outer wall thereof.

Referring to FIG. 2 and FIGS. 4 through 6, the truncated cone 20 comprises a first annular protrusion 22 protruding from a top surface thereof, at which a first shoulder 21 is formed. A second annular protrusion 24 protruding from a top surface of the first annular Protrusion 22 at which a second shoulder 23 is formed. A hole 241 is Provided on the second flange 24 by means of which a control bar 27 is attached thereto.

Figure 7:
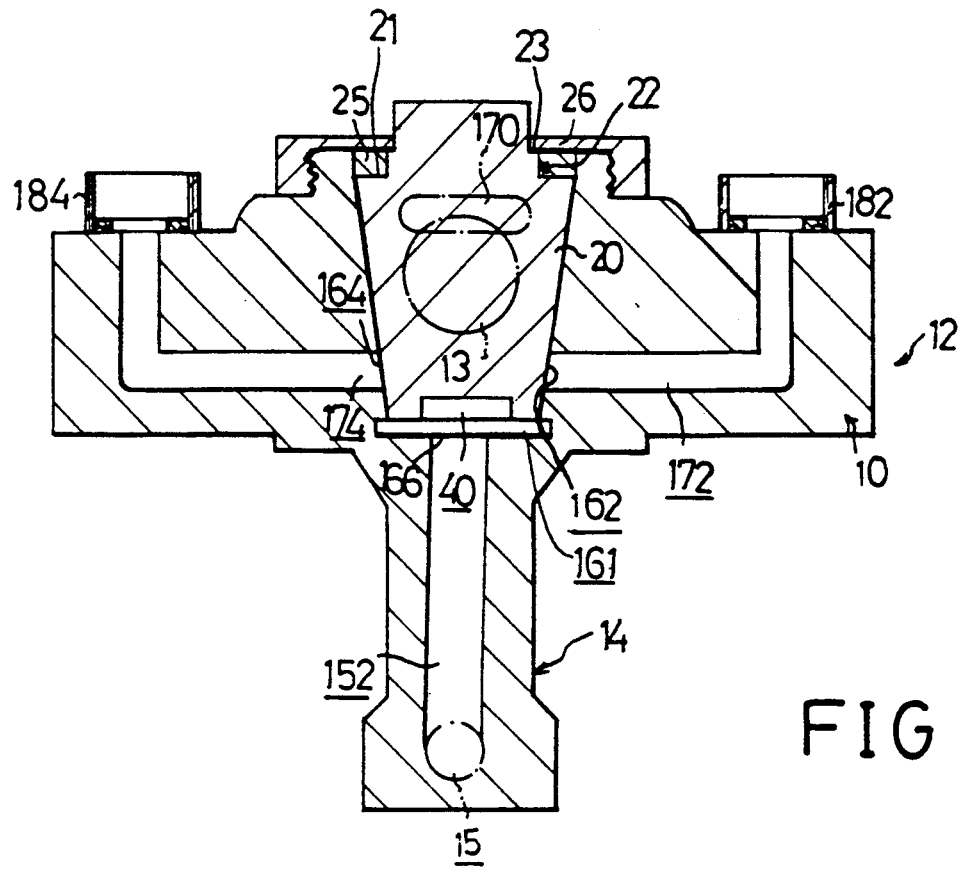
FIG. 7 is a cross-sectional view similar to FIG. 3 in which the truncated cone is positioned in the compartment.

Referring to FIG. 7, the truncated cone 20 is pivotally disposed in the compartment 16. The extended portion 161 remains unoccupied. The second shoulder 23 is at the same level as the top surface of the annular flange 17. A washer 26 is placed on the first shoulder 21 and fills an annular space between the annular flange 17 and the first protrusion 22. An inner threaded cap 26 is provided to engage with the outer threaded wall of the annular flange 17 (see FIG. 2). A plurality of fixing holes 171 is provided on an upper surface of the annular flange 17 for fixing the cap 26 by means of a screw 261 passing through a hole 262 on the cap 26 into one of the holes 171.

Referring to FIGS. 1, 2, 4, 5, 6 and 8, the truncated cone 20 has a first cold water path 30, a first hot water path 32, and a shower head path 38, which communicate with one another. Both the first cold water path 30 and the first hot water path 32 are at the same level as the cold water passage 172 and the hot water passage 174. The outlet of the shower head path 38 is at the same level as the second outlet 170 of the compartment 16, which communicates with a shower head.

The truncated cone 20 also has a second cold water path 36 and a second hot water path 34, in which the upper ends of the two paths 34 and 36 are at the same level as the cold water passage 172 and the hot water passage 174. The second cold water path 30 communicates with an annular recess 40 formed on a bottom portion of the truncated cone 20 through a first vertical path 42. The second hot water path 34 also communicates with the annular recess 40 through a second vertical path 44. The annular recess 40 communicates with the tub outlet 15 via the first outlet 166 of the extended portion 161 and the vertical passage 152.

As shown in FIGS. 1 and 2, the control arm 27 is attached to the threaded hole 241 of the second protrusion 24 of the truncated cone 20 by means of thread connection. Accordingly, the truncated cone 20 is pivotable through a pivotal movement of the control arm 27.

Figure 8:
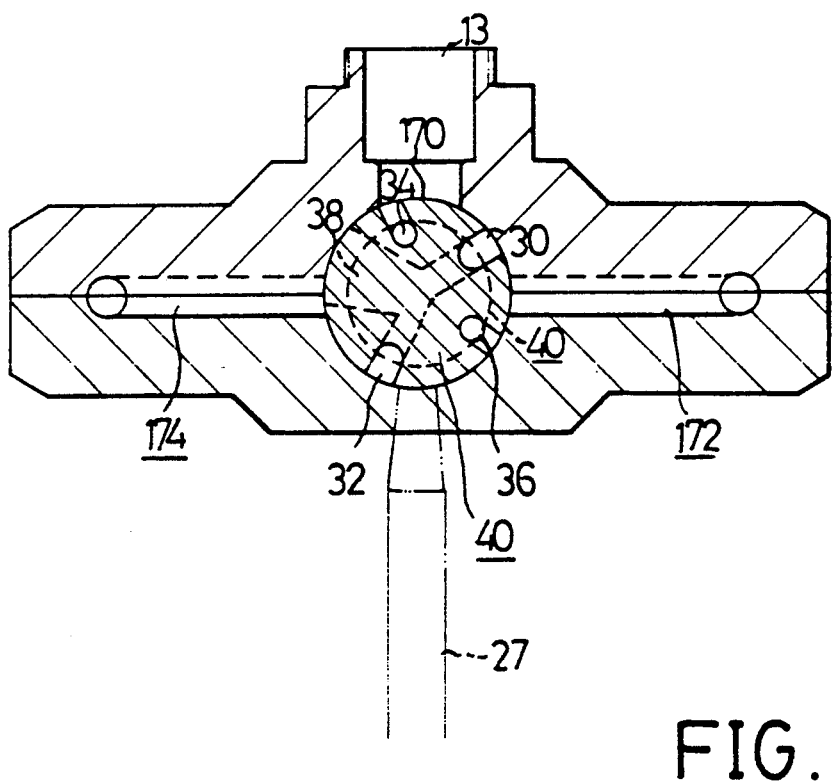
FIG. 8 is a cross-sectional view taken along line 8—8 of FIG. 1 in which a control arm is in a neutral position and the faucet is closed.

Referring to FIG. 8 in which the control arm 27 is in a neutral position. Neither of the hot water paths 32, 34, or the cold water paths 30, 36 communicates with the cold water passage 172 or the hot water passage 174. Consequently, no water is directed to the shower head via the second outlet 170, or the tub head via the first outlet 15.

During use, when the user desires cold water outputs to the shower head, the user ca slightly pivot the control arm 27 leftwards from the neutral position. Initially, the first cold water path 30 partially communicates with the cold water passage 172 and the shower head path 38 partially communicates with the second outlet 170 of the truncated cone 20, while the first hot water path 32 does not yet communicate with the hot water passage 174. Cold water begins to flow to the shower head via the cold water pipe Z, the cold water passage 171, the first cold water path 30, the shower head path 170, and the horizontal passage 13. The more the control arm 27 is pivoted leftwards, the more the first cold water path 30 communicates with the cold water passage 172, and therefore, a greater amount of cold water is outputted to the shower head.

Figure 9:
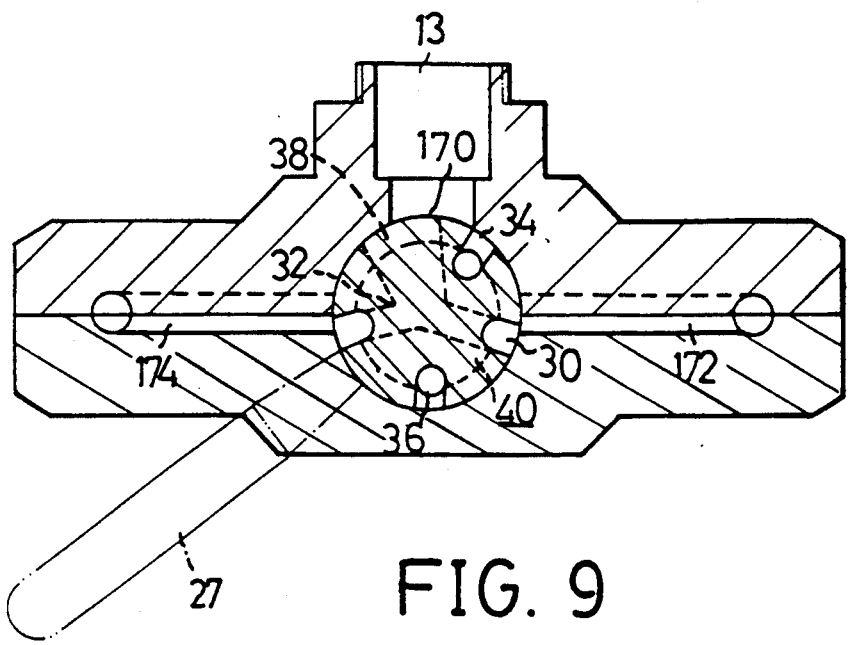
FIG. 9 is a cross-sectional view similar to FIG. 8 in which the control arm is in a leftward position; and the passages of the faucet is communicated with a shower head.

When the first cold water path 30 completely communicates, i.e., is totally aligned, with the cold water passage 172, the first hot water path 32 is just about to communicate with the hot water passage 174; therefore, the faucet has a maximum output of cold water to the shower head. After that, if the control arm is further pivotally moved to the left, the first cold water path 30 is gradually blocked while the first hot water path 32 gradually opens. The temperature of the water output to the shower head gradually increases due to gradual opening of the first hot water path 32 and gradual closing of the first cold water path 30. The faucet has a maximum output of hot water to the shower head when the control arm 27 moves to its leftwardmost position (see FIG. 9 for reference).

When the user desires a cold water output to the tub head, the user can slightly pivot the control arm 27 rightwards from the neutral position shown in FIG. 8. At the beginning, the second cold water path 36 partially communicates with the cold water passage 172 while the second hot water path 34 does not yet communicate with the hot water passage 174. Cold water begins to flow to the tub head via the cold water pipe Z, the cold water passage 171, the second cold water path 36, the first vertical path 42, the annular recess 40, the extended portion 161 of the truncated cone 20, the vertical passage 152, and the first outlet 15. The more the control arm 27 is pivoted rightwardly, the more the second cold water path 36 communicates with the cold water passage 172, and the greater amount of cold water is outputted to the tub head.

Figure 10:
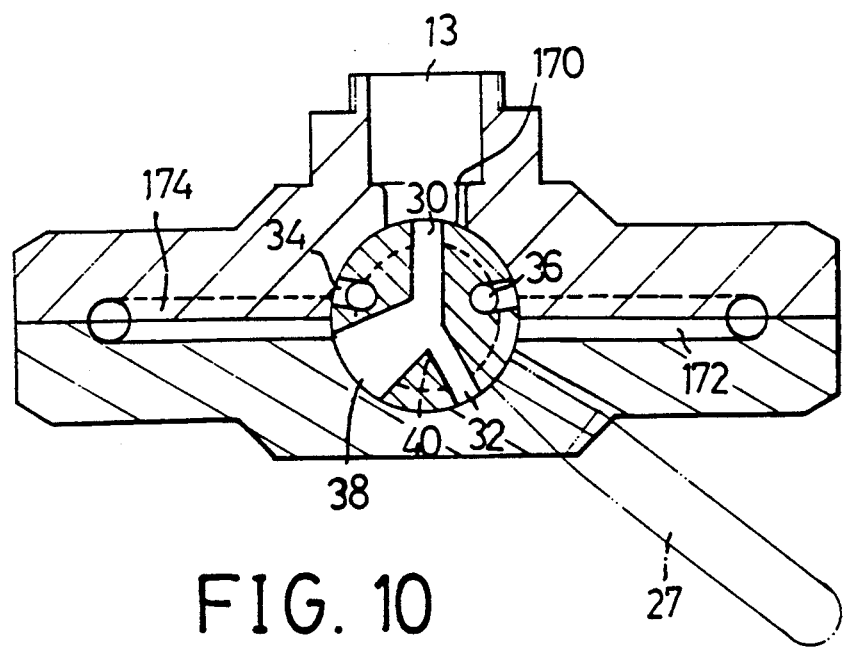
FIG. 10 is a cross-sectional view similar to FIG. 8 in which a control arm is in a rightward position and the passages of the faucet communicate with a tub outlet.

When the second cold water path 36 completely communicates with the cold water passage 172, the second hot water path 34 is just about to communicate with the hot water passage 174; therefore, the faucet has a maximum output of cold water to the tub head. After that, if the control arm 27 is further pivotally moved to the right, the second cold water path 36 is gradually blocked while the second hot water path 34 gradually opens. The temperature of the water output to the tub head gradually increases due to gradual opening of the second hot water path 34 and gradual closing of the second cold water path 36. The faucet has a maximum output of hot water to the tub head when the control arm 27 moves to its rightwardmost position (see FIG. 10 for reference).

Incidentally, the Provision of the extended portion 161 makes the present faucet more durable since small particles, such as sand or the like, which may cause blockage of the faucet and wear between the outer periphery fo the truncated cone 20 and the inner periphery of the compartment 16, will fall into the extended portion 101 without interfering with the operation of the faucet.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A faucet comprising:

a substantially T-shaped body with a truncated cone-shaped compartment formed therein, a hot water passage and a cold water passage being formed in said T-shaped body and respectively communicating with a hot water supply and a cold water supply, a shower outlet which communicates with a shower head and a tub outlet which communicates with a tub being formed on an inner periphery of said cone-shaped compartment;

a truncated cone being pivotally received in said cone-shaped compartment, a control arm being attached to said truncated cone for pivotally controlling the water temperature as well as the output destination of the faucet, said truncated cone having a first hot water path, a first cold water path and a shower head path formed therein which communicate with one another, said truncated cone further having a second hot water path and a second cold water path formed therein which independently communicate with said tub outlet, such that all of said first and second hot water paths, said first and second cold water paths and said shower head path are blocked when said control arm is in a neutral position;

said first hot water path, said first cold water path and said shower head path are respectively communicable with said hot water passage, said cold water passage and said shower outlet when said control arm is in a leftward position while said second hot water path and said second cold water path are blocked; and said first hot water path and said cold water path are respectively communicable with said hot water passage and said cold water passage when said control arm is in a rightward position while said first hot water path, said first cold water path and said shower head path are blocked.

2. A faucet as claimed in claim 1, wherein said compartment extends downwardly to form an extended portion which remains unoccupied when said truncated cone is received in said compartment for preventing blockage of said faucet and wear between an outer periphery of said truncated cone and said inner periphery of said compartment caused by small particle, such as sand or the like.

3. A faucet as claimed in claim 1, wherein the temperature of output water from said shower head gradually increases when said control arm gradually moves from said neutral position to a leftwardmost position.

4. A faucet as claimed in claim 1, wherein the temperature of output water from said tub gradually increases when said control arm gradually moves from said neutral position to a rightwardmost position.

* * * * *